Aug. 16, 1966 R. W. ROEDDER 3,267,484

MAGNETIC STORAGE DRUM

Filed June 25, 1962

INVENTOR
ROBERT W. ROEDDER

BY Edward M. Farrell

ATTORNEY

United States Patent Office 3,267,484
Patented August 16, 1966

3,267,484
MAGNETIC STORAGE DRUM

Robert W. Roedder, Wayne, Pa., assignor to Sperry Rand Corporation, New York, N.Y., a corporation of Delaware Filed June 25, 1962, Ser. No. 204,888
4 Claims. (Cl. 346—74)

This invention relates to a magnetic storage device of the drum type, and more particularly to a magnetic drum of extremely light weight.

The general practice of magnetic recording on a magnetic drum is well established. The periphery of a cylindrical drum is provided with a coating of magnetizable material. One or more transducers are stationary mounted in close proximity to the periphery. The drum is rotated about its longitudinal axis exposing its coating to the magnetic fields radiating from the transducer. Each transducer creates in the coating a circular track of spots of remanent magnetism, each spot representing a bit of information.

A magnetic drum generally forms part of a computer, where it may be called a drum memory. Heretofore, magnetic drums have been made of metal, preferably of copper-base alloys. The amount of information to be stored on a drum can be very large and accordingly the drum becomes large and quite heavy. In order to keep the access time to the stored information short, the speed of revolution of the drum must be high. These factors combined with the heavy weight of the metal drum, require a considerable drive power outlay.

For an airborne computer, although generally having a drum of relatively small size, the weight of a metal drum is a significant disadvantage.

The clearance between the transducer and the drum periphery must be very small for an efficient magnetic coupling between the spots of remanent magnetism and the transducer. The clearance is very critical so that the periphery of the drum must be extremely smooth before the coating of magnetizable material is applied. For a metal drum, the severe requirement of smoothness involves expensive operations of precision machining, polishing, lapping and final balancing in order that the drum may provide satisfactory and reliable service.

Another problem related to the critical clearance between the drum and the head is that the drum must be very accurately concentric with respect to its axis of rotation.

It is accordingly an object of the invention to provide a magnetic drum of extremely low weight.

It is a further object of the invention to provide a magnetic drum which can be manufactured at very low cost.

It is a still further object of the invention to provide a magnetic storage drum having a recording surface suitable for magnetic recording obtained without the aid of expensive machining operations.

According to the invention, a magnetic drum comprises a drive shaft supporting a massive cylinder of plastic foam. Surrounding the plastic foam is a cylindrical sheath of plastic to which the coating of magnetizable material is applied. The drum may be manufactured by enclosing the drive shaft in a cylindrical assembly. The assembly serves as a mold in which a base layer is established centrifugally, smooth and accurately concentric with the drive shaft. After the base layer is established, the plastic sheath is cast centrifugally over said base layer. The interior space of the plastic sheath is subsequently filled with plastic foam.

Further objects and advantages of this invention will be apparent to those skilled in the art of magnetic drums from the following descriptions and the accompanying drawings, in which.

Figure 1:
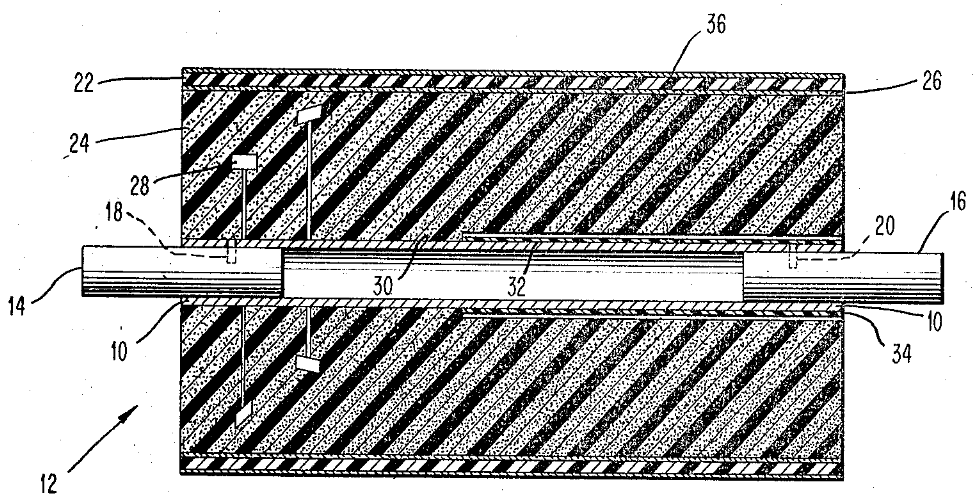
FIG. 1 illustrates a cross-section of a magnetic drum according to the invention.

Referring now particularly to FIG. 1, a drive shaft 10 supports a magnetic drum 12. The drive shaft 10 is a hollow tube, made of metal or a lightweight material such as plastic or cardboard. Into one end of the tube 10 there is inserted a stub shaft 14; into the other end, a stub shaft 16. Both stub shafts 14 and 16 are firmly connected to the tube 10, for example, by means of pins 18 and 20, respectively. The stub shafts 14 and 16 serve to properly journal the tube 10 in journal boxes (not shown). One stub shaft, for example shaft 16, may further be connected to drive means (not shown), such as an electric motor, to rotate the drum about its axis at the required speed.

The drum 12 comprises an outer cylinder 22 surrounding a cylindrical body 24. A layer of magnetizable material 36 coats the cylinder 22. The cylinder 22 may be provided along its inner periphery with a reinforcing layer 26 of fibrous material. The layer 26 forms integrally part of the cylinder 22.

The cylindrical body 24 serves to support the cylinder 22 with respect to the drive shaft 10. The cylinder 24 is made of a foam plastic. The cylinder 24 is not directly attached to the shaft 10 over its entire length. The transmission of torque between the shaft and the cylinder takes place mainly by means of a number of elements 28 connected to the shaft and extending therefrom into the foam cylinder 24. The elements 28 may be of any suitable form, such as bars and plates attached to the shaft 10 in a conventional manner, for example, by means of welding.

The torque transmitting elements 28 are confined to a portion 30 of the shaft 10. The cylinder 24 is free to move axially with respect to the shaft 10 over the length of the portion 32 of the shaft. In this way the foam plastic cylinder 24 is allowed axial movement in connection with thermal expansion. The shaft 10 is surrounded by a sheath or wrap 34 of a plastic material, extending over the portion 32 of the shaft. The material of the wrap is preferably Teflon, since foam of cylinder 24 does not adhere to this type of material.

As mentioned, the cylinder 22 is provided at its outer periphery with a coating 36 of magnetizable material which constitutes the recording surface of the drum. As will become clear hereinbelow, the outer periphery of cylinder 22 is as a result of the particular method according to the invention so smooth that it may directly receive the magnetizable coating without any further pre-treatment such as polishing or lapping. The coating 36 may be applied in a conventional way, for example, by means of plating or spraying.

Figure 2:
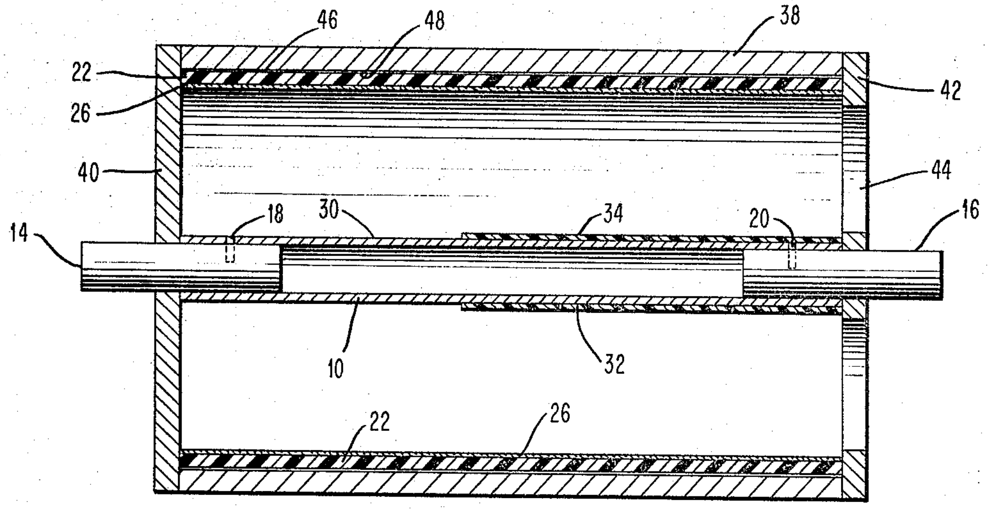
FIG. 2 illustrates an arrangement used to manufacture the drum according to the invention.

The magnetic storage device as described above, in addition to being constructed with very light and inexpensive materials, derives its particular advantages from the method according to which it is manufactured. In the manufacture according to the invention, illustrated by FIG. 2, the drive shaft 10 is surrounded by a metal cylinder 38 concentrically supported with respect to the shaft by means of disks 40 and 42, connected to the ends of shaft 10. Before the drive shaft 10 is enclosed, it may be provided with a wrap 34 of Teflon over a portion 32. The connections between the shaft 10 and the disks 40 and 42, and between the disks and the cylinder 38 are detachable. Disk 42 is provided with a number of holes 44 serving as filler openings. The total assembly may be journalled by means of the stub shafts 14 and 16 in a conventional manner, so that the entire assembly may be rotated about its longitudinal axis.

As a first step in the manufacture according to the invention, the assembly is set in rotation about its longitudinal axis. A quantity of a suitable liquid, for example, molten wax, is introduced into the cylinder 38 at the filler openings 44. The wax is spread centrifugally over the inner periphery of cylinder 38. When the wax is allowed to cool it will solidify, forming a solid layer 46 on the inner periphery of cylinder 38. Since the cooled wax layer has formed under the influence of centrifugal forces, its inner periphery 48 is absolutely smooth and the inner periphery is accurately concentric with respect to the axis of rotation of shaft 10. The importance of these two facts will become clear from the continued description.

A quantity of a liquid plastic is subsequently introduced into cylinder 38 and centrifugally spread over the inner periphery 48 of wax layer 46 to form a plastic sheath 22. The liquid plastic used here may be of the two-component type, known in the art. Such two-component type plastics solidify after a certain time of interaction without the application of heat.

While in rotation and still in the liquid state, glass fibers may be introduced into the cylinder 38 by means of a suitable funneling device. Under the influence of centrifugal forces, these fibers spread out evenly over the plastic sheath 22 and, upon solidification of the plastic, form a strong bond therewith. Alternatively, the glass fibers may be mixed in the two-component plastic before introduction thereof into cylinder 38.

Upon solidification of the plastic sheath 22, the rotation of the assembly is stopped. The assembly is now placed in a vertical position, the filling openings 44 in disk 42 being at the top. Through these filler openings, foam plastic material is introduced to fill the whole interior space of the assembly. This foam plastic may be of the type known in the art, comprising a mixture of two or more liquid components which are adapted, when precisely metered, to react chemically to produce porous resinous or plastic materials. The foam adheres to the shaft 10 along the portion 30. The foam does not adhere, however, to the wrap of Teflon extending over the portion 32 of the shaft. Thus, the body of foam may expand axially along the length of the wrap 34.

The disks 40 and 42 and the cylinder 38 are now removed and the drum 12 comprising the shaft 10, the foam body 24 surrounded by the plastic sheath 22 is obtained. To facilitate removal of the cylinder 38 and to prevent damage to the sheath 22, the layer of wax is removed from the cylinder 38 in a suitable manner, for example, by the application of heat. To the outer periphery of the cylinder 22 is applied the coating 36 of magnetizable material. This may be done, in a conventional manner, for example, by means of plating or spraying.

From the above it will be clear that the magnetic drum manufactured according to the invention has important advantages. First, the drum is light in weight, since the foam material, used for the cylinder 24 and the plastic sheath 22 are both very light. Secondly, the outer periphery of the plastic is extremely smooth and accurately concentric with the drive shaft since it has been cast over the previously centrifugally obtained wax or other such suitable layer. Because of the smoothness and concentricity of the outer periphery of the sheath, no machining operations such as polishing and lapping, are necessary prior to the application of the coating of magnetizable material.

Although hereinabove plastics or synthetic resins have been mentioned as suitable substances for the manufacture of the magnetic drum, it will be understood, that other suitable materials may be used. In principle, any material that lends itself to centrifugal casting may be used, such as for example, materials selected from the group known as elastomers.

The embodiments of the invention in which an exclusive property or privilege is claimed are defined as follows:

1. A magnetic storage device of the drum type comprising a hollow tubular shaft, a cylinder of foam plastic surrounding said shaft, torque transmission elements connected to said shaft and extending into said cylinder, a sheath of plastic surrounding said cylinder of plastic foam, and a coating of magnetizable material on said sheath.

2. The invention as set forth in claim 1 wherein said sheath comprises a layer of fibrous material, said layer being integrally formed over said sheath.

3. The invention as set forth in claim 1 wherein a sheath of a plastic material extends over a portion of said shaft and in between said shaft and said cylinder, said plastic material being disposed to prevent adhesion of said foam material to said shaft.

4. A magnetic drum comprising a shaft, a cylinder of foam plastic surrounding said shaft, means for coupling said cylinder to said shaft, a plastic medium on said cylinder, and a magnetizable coating surrounding said plastic medium.

References Cited by the Examiner

UNITED STATES PATENTS

| | | | |
|---|---|---|---|
| 2,229,293 | 1/1941 | Huntley | 179—100.2 |
| 3,001,850 | 9/1961 | Marrs | 346—74 |
| 3,036,304 | 5/1962 | Willard | 346—74 |
| 3,110,552 | 11/1963 | Voelker | 264—45 |
| 3,120,570 | 2/1964 | Kennedy | 264—45 |
| 3,174,152 | 2/1965 | Maclay | 346—74 |

BERNARD KONICK, *Primary Examiner.*

IRVING L. SRAGOW, *Examiner.*

R. J. McCLOSKEY, A. F. BERNARD, *Assistant Examiners.*